United States Patent
Sakagami et al.

(10) Patent No.: US 10,498,927 B2
(45) Date of Patent: Dec. 3, 2019

(54) MANAGEMENT APPARATUS, IMAGE FORMING APPARATUS MANAGEMENT SYSTEM FOR MANAGING USAGE OF THE IMAGE FORMING APPARATUS

(71) Applicants: Atsushi Sakagami, Kanagawa (JP); Naoto Sakurai, Saitama (JP); Daiya Miyasaka, Chiba (JP); Koji Sasaki, Kanagawa (JP); Tomoko Nishizawa, Tokyo (JP)

(72) Inventors: Atsushi Sakagami, Kanagawa (JP); Naoto Sakurai, Saitama (JP); Daiya Miyasaka, Chiba (JP); Koji Sasaki, Kanagawa (JP); Tomoko Nishizawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/929,066

(22) Filed: Nov. 27, 2018

(65) Prior Publication Data

US 2019/0098175 A1    Mar. 28, 2019

Related U.S. Application Data

(63) Continuation of application No. 15/611,541, filed on Jun. 1, 2017, now Pat. No. 10,171,705, which is a
(Continued)

(30) Foreign Application Priority Data

Mar. 2, 2006    (JP) .................................. 2006-056404

(51) Int. Cl.
*H04N 21/441*    (2011.01)
*G06F 21/34*    (2013.01)
(Continued)

(52) U.S. Cl.
CPC ......... *H04N 1/4426* (2013.01); *G06F 3/1222* (2013.01); *G06F 21/34* (2013.01);
(Continued)

(58) Field of Classification Search
USPC .......... 283/69–77; 358/1.1–3.29; 399/75, 80; 726/1–31
See application file for complete search history.

(56) References Cited

U.S. PATENT DOCUMENTS 8,510,856 B2 * 8/2013 Murakawa .............. G06F 21/31
726/16
2001/0021979 A1    9/2001 Ito
(Continued)

FOREIGN PATENT DOCUMENTS

EP    1 398 954 A2    3/2004
EP    1 569 437 A2    8/2005
(Continued)

OTHER PUBLICATIONS

Office Action dated Jun. 14, 2019 in European Patent Application No. 12 195 767.4, 5 pages.

*Primary Examiner* — Marcellus J Augustin
(74) *Attorney, Agent, or Firm* — Oblon, McClelland, Maier & Neustadt, L.L.P.

(57) ABSTRACT

A management apparatus connected to an image forming apparatus for managing usage of the image forming apparatus is disclosed. The management apparatus includes a user data storage part for storing user identification data and use restriction data corresponding to the user identification data, and a use restriction data acquiring part for acquiring the use restriction data corresponding to the user identification data.

14 Claims, 12 Drawing Sheets

Related U.S. Application Data continuation of application No. 14/866,501, filed on Sep. 25, 2015, now Pat. No. 9,699,356, which is a continuation of application No. 14/707,963, filed on May 8, 2015, now Pat. No. 9,172,845, which is a continuation of application No. 13/673,577, filed on Nov. 9, 2012, now Pat. No. 9,058,559, which is a continuation of application No. 11/677,772, filed on Feb. 22, 2007, now Pat. No. 8,334,994.

(51) Int. Cl.

| | | |
|---|---|---|
| *G06F 21/60* | (2013.01) | |
| *G06F 21/62* | (2013.01) | |
| *H04N 1/44* | (2006.01) | |
| *H04N 1/32* | (2006.01) | |
| *G06K 15/00* | (2006.01) | |
| *G06F 3/12* | (2006.01) | |

(52) U.S. Cl.
CPC .......... *G06F 21/608* (2013.01); *G06F 21/629* (2013.01); *G06K 15/40* (2013.01); *G06K 15/4095* (2013.01); *H04N 1/32122* (2013.01); *H04N 1/32561* (2013.01); *H04N 1/444* (2013.01); *H04N 1/4413* (2013.01); *H04N 1/4433* (2013.01); *H04N 2201/0094* (2013.01); *H04N 2201/3205* (2013.01); *H04N 2201/3221* (2013.01)

(56) References Cited

U.S. PATENT DOCUMENTS

| | | |
|---|---|---|
| 2003/0086111 A1 | 5/2003 | Akiyoshi |
| 2004/0021890 A1 | 2/2004 | Hirai et al. |
| 2004/0093523 A1 | 5/2004 | Matsuzaki et al. |
| 2005/0033994 A1 | 2/2005 | Suzuki |
| 2005/0144253 A1 | 6/2005 | Yoshino et al. |
| 2005/0168769 A1 | 8/2005 | Kim |
| 2005/0205668 A1 | 9/2005 | Sogo |
| 2005/0210293 A1 | 9/2005 | Ohtani |
| 2005/0213151 A1 | 9/2005 | Yajima et al. |
| 2005/0234944 A1 | 10/2005 | Ohtani |
| 2006/0001900 A1 | 1/2006 | Watanabe et al. |
| 2006/0045555 A1 | 3/2006 | Morimoto |
| 2006/0069918 A1 | 3/2006 | Takahashi et al. |
| 2006/0085524 A1 | 4/2006 | Lee |
| 2006/0107062 A1 | 5/2006 | Fauthoux |
| 2006/0126100 A1 | 6/2006 | Jung |
| 2006/0230286 A1 | 10/2006 | Kitada |
| 2006/0265596 A1 | 11/2006 | Nagayama |
| 2006/0269341 A1 | 11/2006 | Aoki et al. |
| 2007/0150953 A1* | 6/2007 | Hamid ............ G06F 21/31 726/23 |
| 2008/0231887 A1 | 9/2008 | Sakagami et al. |

FOREIGN PATENT DOCUMENTS

| | | |
|---|---|---|
| EP | 1 574 930 A2 | 9/2005 |
| JP | 2004-29946 | 1/2004 |
| JP | 2004-222141 | 8/2004 |

* cited by examiner

MANAGEMENT APPARATUS, IMAGE FORMING APPARATUS MANAGEMENT SYSTEM FOR MANAGING USAGE OF THE IMAGE FORMING APPARATUS

CROSS REFERENCE TO RELATED APPLICATIONS

The present application is a continuation of, and claims the benefit of priority under 35 U.S.C. § 120, of U.S. application Ser. No. 15/611,541, filed Jun. 1, 2017, which is a continuation of U.S. application Ser. No. 14/866,501 (now U.S. Pat. No. 9,699,356), filed Sep. 25, 2015, which is a continuation of U.S. application Ser. No. 14/707,963 (now U.S. Pat. No. 9,172,845), filed May 8, 2015, which is a continuation of U.S. application Ser. No. 13/673,577 (now U.S. Pat. No. 9,058,559), filed Nov. 9, 2012, which is a continuation of U.S. application Ser. No. 11/677,772 (now U.S. Pat. No. 8,334,994), and claims the benefit of priority under 35 U.S.C. § 119, from Japanese Patent Application No. 2006-056404, filed Mar. 2, 2006, the entire contents of all of which are incorporated herein by reference.

BACKGROUND OF THE INVENTION

1. Field of the Invention

The present invention relates to a management apparatus and an image forming apparatus management system for managing processes executed by an image forming apparatus such as a multifunction machine.

2. Description of the Related Art

In recent years and continuing, there are many cases where an image forming apparatus (e.g. a multifunction machine having a facsimile function, a scanner function, and a copier function) is connected to plural computer terminals via a network and shared within a certain organization (e.g. office, company). In this environment, it is necessary to maintain confidentiality of the image data handled inside the network. Furthermore, it is desired to further improve efficiency of the image forming apparatus since the image forming apparatus is shared by plural users.

For example, in a network scanner apparatus disclosed in Japanese Laid-Open Patent Application No. 2004-222141, there is provided an address data storing part to which address data are stored (in correspondence with each address to which data are to be delivered via the network including at least user name, password, delivery data, and other addresses that may be used by the user of a corresponding address. Accordingly, user authentication is performed with the address data storing part based on a combination of the user name and the password in the address data storing part. Thus, use of the network scanner apparatus can only be allowed for a user who has succeeded at the user authentication.

However, with the network scanner apparatus disclosed in Japanese Laid-Open Patent Application No. 2004-222141, since image data read out from a document are transferred from the network scanner apparatus to a predetermined address, there is a possibility that the transferred image data be viewed by an unintended person in a case where a terminal corresponding to the predetermined address is shared by plural users.

Furthermore, the network scanner apparatus disclosed in Japanese Laid-Open Patent Application No. 2004-222141 allows use by all users authenticated in the user authentication. Since recent image forming apparatuses are provided not only with a scanner function but also with various other functions such as a facsimile function and a printing function, there is a possibility that the functions of the image forming apparatus will be used for unintended purposes in a case where the user is allowed to freely use the image forming apparatus.

SUMMARY OF THE INVENTION

The present invention may provide a management apparatus and an image forming apparatus management system that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a management apparatus and an image forming apparatus management system particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a management apparatus connected to an image forming apparatus for managing usage of the image forming apparatus, the management apparatus including: a user data storage part for storing user identification data and use restriction data corresponding to the user identification data; and a use restriction data acquiring part for acquiring the use restriction data corresponding to the user identification data.

Another embodiment of the present invention provides an image forming apparatus management system including: an image forming apparatus; and a management apparatus for managing usage of the image forming apparatus; wherein the management apparatus includes a user data storage part for storing user identification data and use restriction data corresponding to the user identification data, a use restriction data acquiring part for acquiring the use restriction data corresponding to the user identification data, and a first communication part for communicating with the image forming apparatus, wherein the image forming apparatus includes a user identification data obtaining part for obtaining the user identification data, and a second communication part for communicating with the management apparatus.

Another embodiment of the present invention provides an image forming apparatus management system including: an image forming apparatus; an operation terminal connected to the image forming apparatus; and a management apparatus for managing usage of the image forming apparatus; wherein the management apparatus includes a user data storage part for storing user identification data and use restriction data corresponding to the user identification data, a use restriction data acquiring part for acquiring the use restriction data corresponding to the user identification data, and a first communication part for communicating with the operation terminal, wherein the image forming apparatus includes a user identification data obtaining part for obtaining the user identification data and a second communication part for communicating with the management apparatus.

Another embodiment of the present invention provides an image forming apparatus management system including: an image forming apparatus; a control terminal connected to the image forming apparatus for controlling the image forming apparatus; a management apparatus for managing usage of the image forming apparatus; and a print process apparatus for processing print commands to be executed by the image forming apparatus; wherein the management apparatus includes a user data storage part for storing user identification data and use restriction data corresponding to the user identification data, a use restriction data acquiring part for acquiring the use restriction data corresponding to the user identification data, and a first communication part for communicating with the control terminal and the print process apparatus, wherein the control terminal includes a user identification data obtaining part for obtaining the user identification data, a print process instructing part for instructing execution of a printing process by the print process apparatus, and a second communication part for communicating with the management apparatus and the print process apparatus; wherein the print process apparatus includes a print process controlling part for controlling execution of the print commands, a print command storage part for storing the print commands, and a third communication part for communicating with the image forming apparatus, the control terminal and the management apparatus.

Other objects and further features of the present invention will be apparent from the following detailed description when read in conjunction with the accompanying drawings.

DESCRIPTION OF THE PREFERRED EMBODIMENTS

In the following, embodiments of the present invention are described with reference to the accompanying drawings.

Embodiment 1

Figure 1:
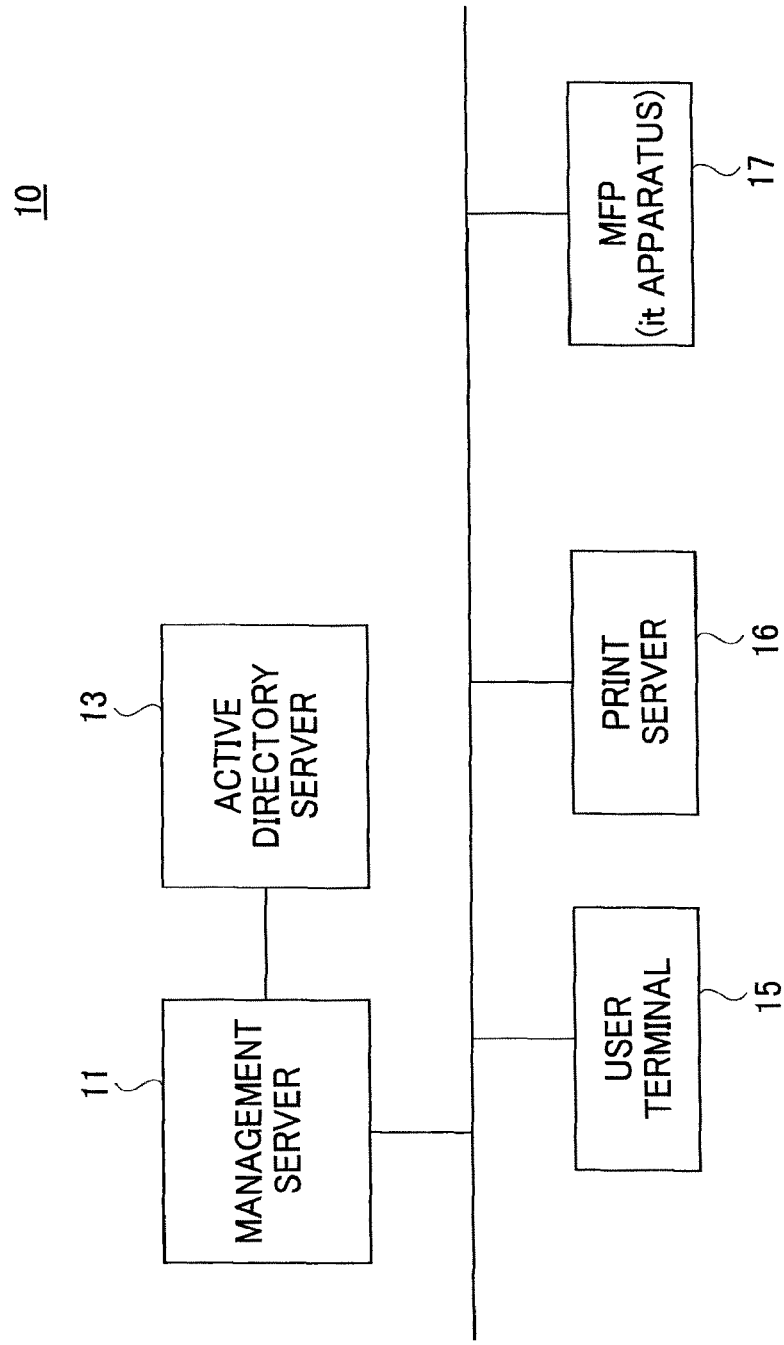
FIG. 1 is a schematic diagram showing an image forming apparatus management system according to a first embodiment of the present invention.

FIG. 1 is a schematic diagram showing an image forming apparatus management system 10 according to the first embodiment of the present invention. The image forming apparatus management system 10 has a management server 11, an Active Directory server (hereinafter referred to as "AD server") 13, a user terminal 15, a print server 16, and an image forming apparatus 17 (including multifunction peripheral) which are connected by a network.

In the image forming apparatus management system 10, user identification data obtained from the image forming apparatus 17 is transmitted to the management server 11. Based on the user identification data, the management server 11 obtains data indicating access restrictions regarding the use of the image forming apparatus 17 (access restriction data) in correspondence with each user. The management server 11 transmits the obtained access restriction data to the image forming apparatus 17. The image forming apparatus 17 controls use of the image forming apparatus 17 by each user according to the access restriction data.

The management server 11 is a management apparatus managing user data and having control over the image forming apparatus 17. The management server 11 is described in further detail below. The AD server 13 stores user ID data for identifying the user of the image forming apparatus 17. The user ID data stored in the AD server 13 may be registered beforehand, for example, by a manager of the image forming apparatus management system 10 or a user using the user terminal 15.

In a user authentication process by the management server 11 for allowing the user to use the image forming apparatus 17, the management server 11 may select whether to perform the user authentication process according to the user ID data stored in the AD server 13.

The user terminal 15 is used, for example, for selecting a document to be printed by the image forming apparatus 17 and instructing the image forming apparatus 17 to perform printing. The user terminal 15 may be, for example, a computer having a CPU and a memory. The user terminal 15 may also be used for changing various settings and conditions of the management server 11. The print server 16 is a print process apparatus that temporarily stores printing jobs (i.e. print commands to be executed by the image forming apparatus 17) transmitted from the user terminal 15. The print server 16 is described in further detail below.

The image forming apparatus 17 is a multifunction machine (MFP, Multi Function Peripheral) having, for example, a facsimile function, a scanner function, a copying function, and a printing function. In this example, the image forming apparatus 17 includes an IC card reader. The IC card reader obtains IC card identification data which includes inherent IC card data (data inherent to the IC card).

Next, the image forming apparatus 17, the management server 11, and the print server 16 are described with reference to FIGS. 2-4.

Figure 2:
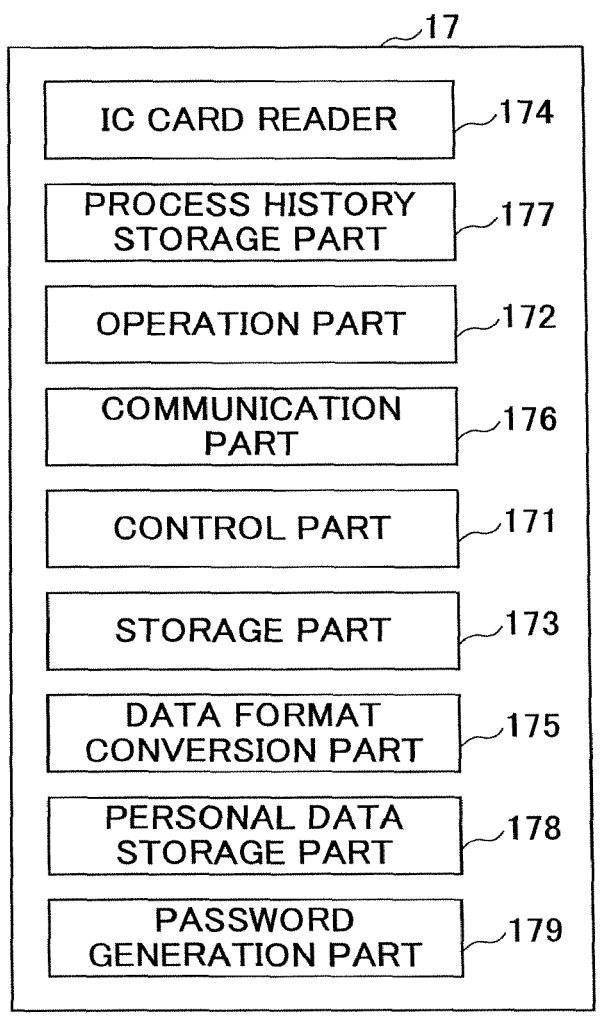
FIG. 2 is a block diagram for describing functions of a image forming apparatus according to the first embodiment of the present invention.

FIG. 2 is a block diagram for describing functions of the image forming apparatus 17 according to an embodiment of the present invention. The image forming apparatus includes a control part 171, an operation part 172, a storage part 173, an IC card reader 174, a data format conversion part 175, a communication part 176, a process history storage part 177, an individual data storage part 178, and a password generation part 179.

The control part 171 performs the processes for executing the above-described functions including, for example, the facsimile function, the scanner function, the copying function, and the printing function and controls the processes. The operation part 172 is for operating the image forming apparatus 17. The operation part 172 may be, for example, a ten-key or a control panel. It is preferable to provide a display part to the operation part 172 for enabling the user to view, for example, the status of the image forming apparatus 17 or a list indicating processes that can be executed by the image forming apparatus 17.

The storage part stores, for example, settings (set parameters) of the image forming apparatus 17, image data read out by the image forming apparatus, and electronic document data. The IC card reader 174 obtains IC card identification data inherent in the IC card of the user. Although the IC card reader 174 of this embodiment of the present invention is a contactless type card reader which can obtain IC card data without contacting an IC card, the IC card reader 174 may also be a contact type card reader which obtains IC card data by contacting an IC card. Furthermore, although the IC card reader 174 of this embodiment of the present invention is provided inside the image forming apparatus 17, the IC card reader 174 may be connected to the outside of the image forming apparatus 17 with a suitable connecting method.

The data format conversion part 175 controls the conversion of formats of IC card identification data obtained by the IC card reader 174. The IC card used in this embodiment of the present invention is a FeliCa card (Felicity Card), the IC card identification data obtained from the IC card reader 174 are data obtained in a format corresponding to FeliCa, and the IC card data used in executing the processes of the image forming apparatus 17 are data having a format of the FeliCa card.

In a case where the IC card being used is not a FeliCa card, it is likely that the format of the IC card identification data of the IC card is different from the IC card identification data of the FeliCa card. In this case, the data format conversion part 175 may perform a plug-in process so that the format of the IC card identification data obtained from the IC card can be changed to the same format as the IC card identification data of the FeliCa card.

The communication part 176 is for communicating with, for example, the management apparatus 11 and the user terminal 15. The process history storage part 177 is for storing the history of the processes executed by the image forming apparatus 17. The history stored in the process history storage part 177 is stored in correspondence with user identification data and the type of process. Thereby, the history of an executed process can be searched for by referring to user identification data and/or the type of process. The search results may be displayed, for example, in a display part provided in the operation part 172 for allowing the user to view the search results.

Furthermore, the process history storage part 177 may also store data indicating, for example, the history of the execution of the printing function, the user ID of the user using the image forming apparatus 17, the name assigned to the image forming apparatus 17, the time of initiating a desired process, the time of completing a desired process, the electronic document processed by the image forming apparatus 17, and/or the number of pages of the image data.

The data of the process history stored in the process history storage part 177 are periodically uploaded to the management server 11 via the communication part 176 and stored also in the management server 11.

The individual data storage part 178 stores individual data in correspondence with each user. The individual data include, for example, setting data for the image forming apparatus 17 in correspondence with each user, address book data, image data and electronic document data processed or to be processed by the image forming apparatus 17. Furthermore, the individual data correspond to user identification data. In a case where "personal menu" (described below) is selected, the image forming apparatus 17 reads out corresponding individual data. In this case where personal menu is selected and corresponding individual data are read out, the control part 171 executes a process(es) of the image forming apparatus 17 in accordance with the individual data.

The password generation part 179 generates a password(s) based on the user identification data by using a predetermined algorithm.

In the image forming apparatus 17, the applications used for executing the above-described functions of the data format conversion part 175, the process history storage part 177, the individual data storage part 178, and the password generation part 179 may be loaded into the image forming apparatus 17 by mounting a detachable recording medium onto the image forming apparatus 17. In this case, it is preferable to provide a recording medium reading part to the image forming apparatus 17 for reading data from the recording medium. Accordingly, the above-described functions can be executed by reading corresponding applications from the recording medium. Furthermore, the recording medium may be, for example, a SD (Secure Digital) memory card.

Figure 3:
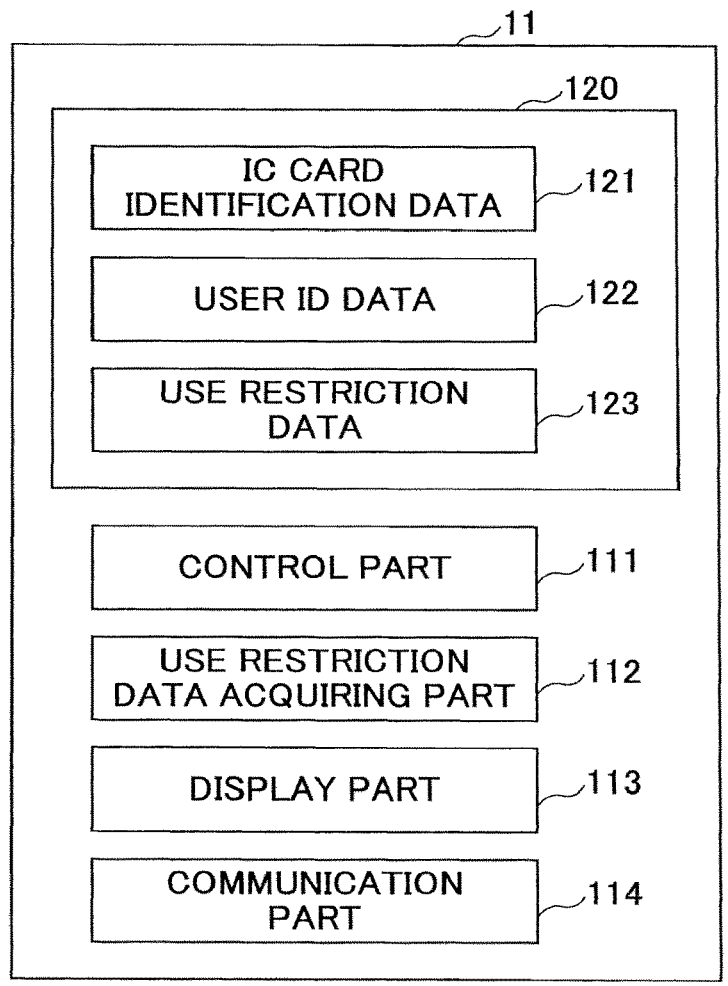
FIG. 3 is a block diagram for describing functions of a management server according to a first embodiment of the present invention.

FIG. 3 is a block diagram for describing functions of the management server 11 according to an embodiment of the present invention. The management server 11 includes a user data storage part 120, a control part 111, a use restriction data acquiring part 112, a display part 113, and a communication part 114.

The user data storage part 120 contains IC card identification data 121, user ID data 122, and use restriction data 123. The IC card identification data 121 are data obtained from an IC card(s) beforehand by the IC card reader 174. The user ID data 122 are data stored in correspondence with the IC card identification data 121 for enabling the control part 111 to extract target user ID data from the user ID data 122 by referring to corresponding IC card identification data 121. The user identification data according to this embodiment of the present invention refers to a combination of data including IC card identification data 121 and corresponding user ID data 122.

The use restriction data 123 indicates, for example, functions, settings, and conditions of the image forming apparatus 17 when the user uses the image forming apparatus 17. The use restriction data 123 are stored in correspondence to the user ID data 122. The above-described data stored in the user data storage part 120 are registered (input) beforehand by, for example, a manager of the image forming apparatus management system 10 or a user.

The control part 111 controls the processes executed in the management server 11. The use restriction data acquiring part 112 is for acquiring use restriction data 123 stored in the user data storage part 120. The display part 113 is for displaying data regarding the status of the image forming apparatus management system 10 (e.g., status of the management server 11 itself, status of components and apparatuses connected to the management server 11). The display part 113 may be, for example, a liquid crystal panel provided in the management server 11 or a liquid crystal display connected to an external part of the management server 11 via a suitable connecting component. The communication part 114 is for communicating with, for example, the print server 16 and the image forming apparatus 17.

Figure 4:
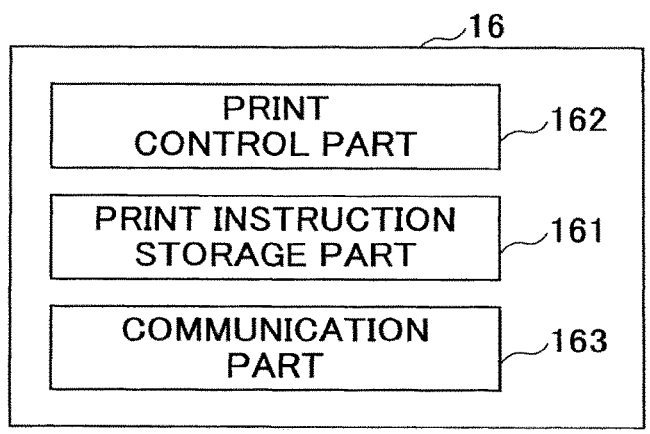
FIG. 4 is a block diagram for describing the functions of a print server according to the first embodiment of the present invention.

FIG. 4 is a block diagram for describing the functions of the print server 16 according to an embodiment of the present invention. The print server 16 includes, for example, a print instruction storage part 161, a print control part 162, and a communication part 163. The print instruction storage part 161 is for temporarily storing print jobs (print commands) transmitted from the user terminal 15. When a printing request (print instruction) is given from the user terminal 15 or the image forming apparatus 17, the print control part 162 instructs that a print job(s) stored in the print command storage part 161 be transmitted to the image forming apparatus 17. Accordingly, the image forming apparatus 17 executes the print job(s). The communication part 163 is for establishing communications between the management server 11 and the image forming apparatus 17.

For example, in a case where plural image forming apparatuses 17 are connected to the image forming apparatus management system 10, the print server 16 according to an embodiment of the present invention allows an image forming apparatus to be selected as the destination for receiving a print job(s) stored in the print command storage part 161. For example, in a case where one of the plural image forming apparatuses 17 is in the middle of executing another process, the print control part 162 avoids selecting the executing image forming apparatus 17 as the print job destination and alternatively selects another image forming apparatus 17. Thereby, print jobs can be speedily executed by the image forming apparatuses 17.

In this example, a maximum of four print servers 16 can be connected to a single image forming apparatus 17. By connecting plural print servers 16 to one image forming apparatus 17, more print jobs can be stored in the print servers 16. Furthermore, since the print server 16 is able to select an available image forming apparatus 17 and allow the selected image forming apparatus 17 to promptly execute a print job, the stored print jobs can be speedily executed without increasing the workload of the image forming apparatuses 17. Furthermore, in a case where one of the print servers 16 is disabled (failure), repair, maintenance, or inspection can be performed on the disabled print server 16 without having to shut down the entire image forming apparatus management system 10 by operating the other remaining printer servers 16.

Figure 5:
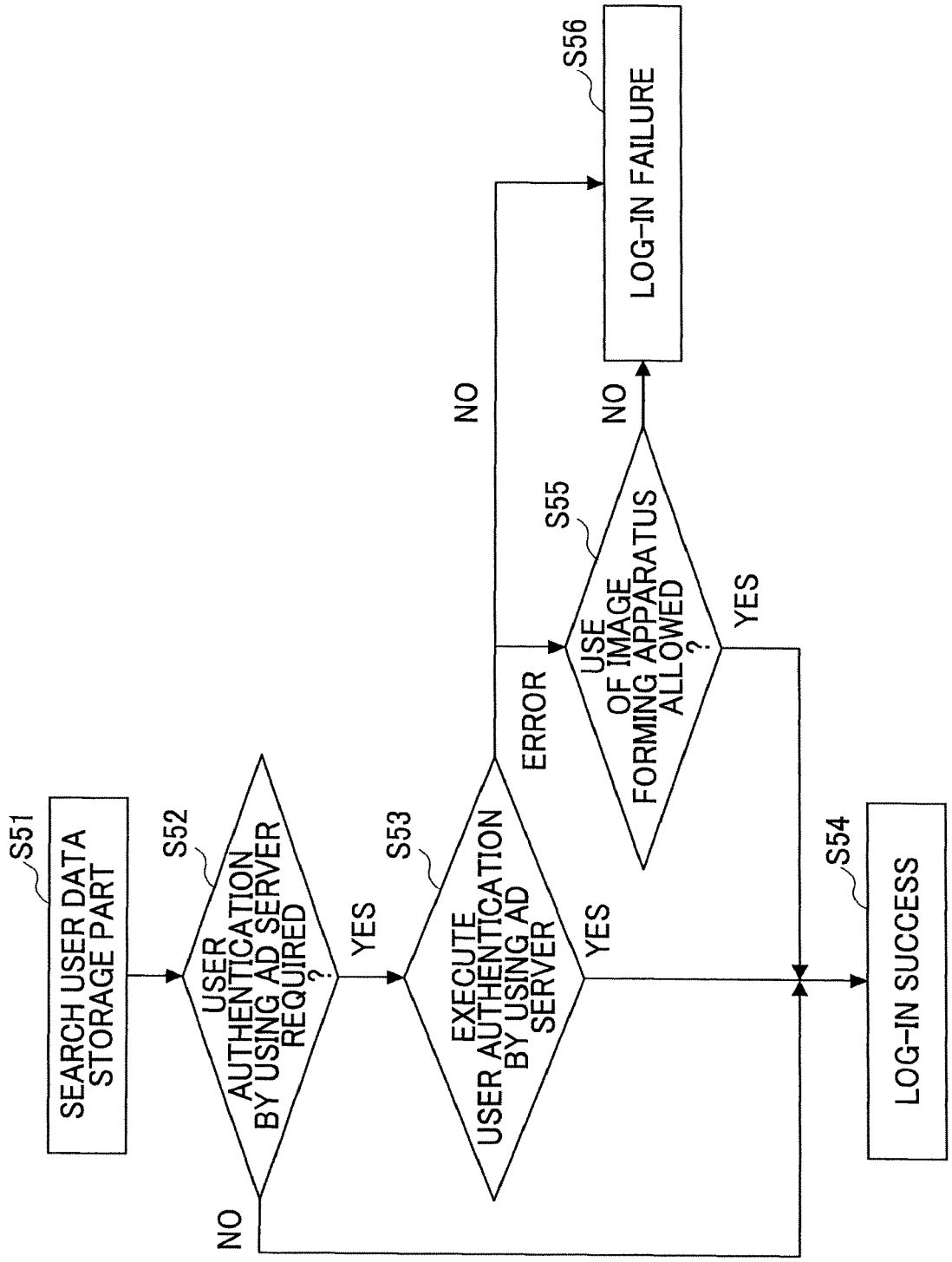
FIG. 5 is a flowchart showing a user authentication process of an image forming apparatus management system according to an embodiment of the present invention.

Next, a user authentication process of the image forming apparatus management system 10 is described with reference to FIG. 5. FIG. 5 is a flowchart showing a user authentication process of the image forming apparatus management system 10 according to an embodiment of the present invention.

The image forming apparatus 17 obtains IC card identification data with the IC card reader 174 and transmits the obtained IC card identification data to the management server 11 with the communication part 176. In the management server 11, when the communication part 114 receives the IC card identification data from the image forming apparatus 17, the control part 111 searches through IC card identification data stored in the user data storage part 120 based on the received IC card identification data, to thereby determine whether IC card identification data corresponding to the received IC card identification data are stored in the user data storage part 120 (Step S51).

In a case where IC card identification data 121 corresponding to the received IC card identification data are stored in the user data storage part 120, the control part 111 extracts a user ID corresponding to the ID card identification data from the user ID data 122 stored in the user data storage part 120. Then, the control part 111 determines whether the management server 11 is set to execute a user authentication process by using the AD server 13 (Step S52).

In a case where the management server 11 is set to execute the user authentication process by using the AD server 13 (Yes in Step S52), the control part 111 accesses the AD server 13 and determines whether the extracted user ID exists in the user ID data stored in the AD server 13 (Step S53).

In a case where there is a corresponding user ID in the AD server 13 (Yes in Step S53), the control part 111 authenticates the user of the user ID (log-in success, Step S54). In a case where the management server 11 is not set to execute the user authentication process by using the AD server 13 (No in Step S52), the control part 111 determines that the user is authenticated at the time when corresponding user data are found in the user data storage part 120.

In a case where the determination process (determining whether a corresponding user ID exists in the AD server 13) of Step S53 fails (error), the control part 111 determines whether to allow the user of the user ID to use the image forming apparatus 17 by referring to the use restriction data 123 corresponding to the user ID (Step S55). In a case where the user ID corresponds to an authorized user, the control part 111 determines that the user is authenticated (log-in success). In a case where the user ID corresponds to an unauthorized user, the control part 111 determines that the log-in operation has failed and ends the user authentication process (Step S56).

In a case where the user is authenticated in the user authentication process in Step S54, the control part 111 instructs the use restriction data acquiring part 112 to acquire use restriction data corresponding to the authenticated user from the use restriction data 123 stored in the user data storage part 120. Then, the control part 111 instructs the communication part 114 to transmit the acquired use restriction data to the image forming apparatus 17.

In the image forming apparatus 17, the control part 171 controls processes of the image forming apparatus 17 in accordance with the use restriction data received from the management server 11, so that the authenticated user can only use functions allowed to be used by the user.

Next, a personal menu process executed by the image forming apparatus 17 is described with reference to FIGS. 6, 7A and 7B. The "personal menu" according to an embodiment of the present invention refers to functions which can be used only by users having their user ID and password registered beforehand in the image forming apparatus 17. The functions that can be executed with the "personal menu" include, for example, accessing and browsing data (e.g. image data, electronic document data) stored in the image forming apparatus 17 in correspondence with each user, using an address book corresponding to each user, and browsing mail documents corresponding to each user. Furthermore, in a case where the personal menu is selected by the user, the display of the display part of the operation part 172 or the settings of the image forming apparatus 17, for example, can be customized in correspondence with each user. In this example, "personal menu process" refers to a process that is executed by the image forming apparatus 17 when the personal menu is selected.

Figure 6:
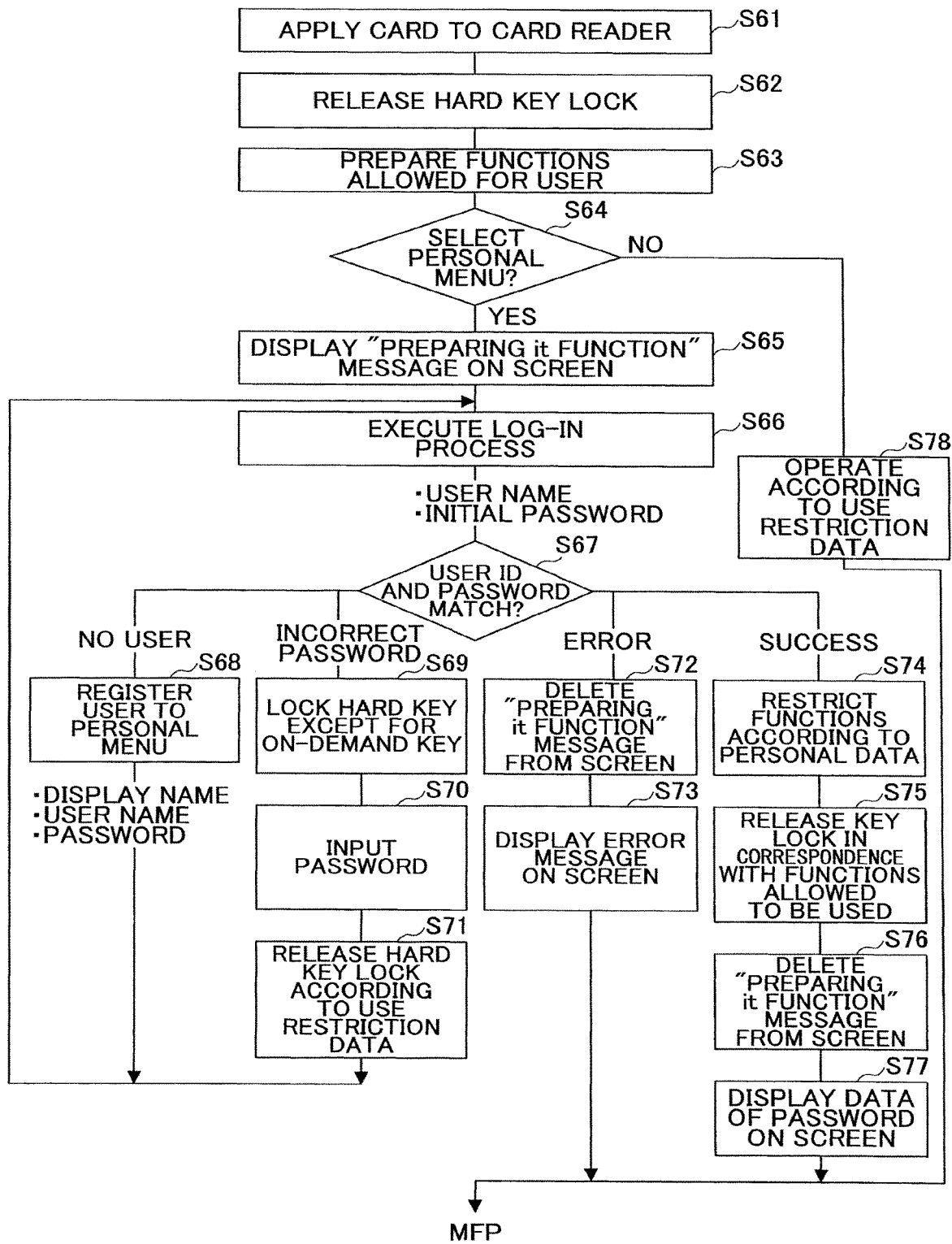
FIG. 6 is a flowchart for describing an operation of the personal menu process of an image processing apparatus according to the first embodiment of the present invention.

FIG. 6 is a flowchart for describing an operation of the personal menu process of the image processing apparatus 17 according to an embodiment of the present invention. FIGS. 7A and 7B are schematic diagrams for describing the statuses of the operation part 172 in a case where the personal menu is selected by the user. More specifically, FIG. 7A shows a status of the operation part 172 before logging in to the personal menu. FIG. 7B shows a status of the operation part 172 after logging in to the personal menu.

The user authentication process (described above with FIG. 5) of the image forming apparatus 17 is initiated by having the user place his/her IC card onto or in the proximity of the IC card reader 174 (Step S61). Until the user is authenticated, the image forming apparatus 17 keeps the operation part 172 in a state which cannot be operated by the user (this state is hereinafter referred to as "hard key lock state").

When the user authentication process of Step S61 is completed and the user is determined as a user authorized to use the image forming apparatus 17, the control part 171 releases (unlocks) the hard key lock state (Step S62). Then, the control part 171, in accordance with the use restriction data obtained from the management server 11, alters the status of the image forming apparatus 17 to a status allowing execution of predetermined functions allowed to be executed by the user (Step S63).

Figure 7:
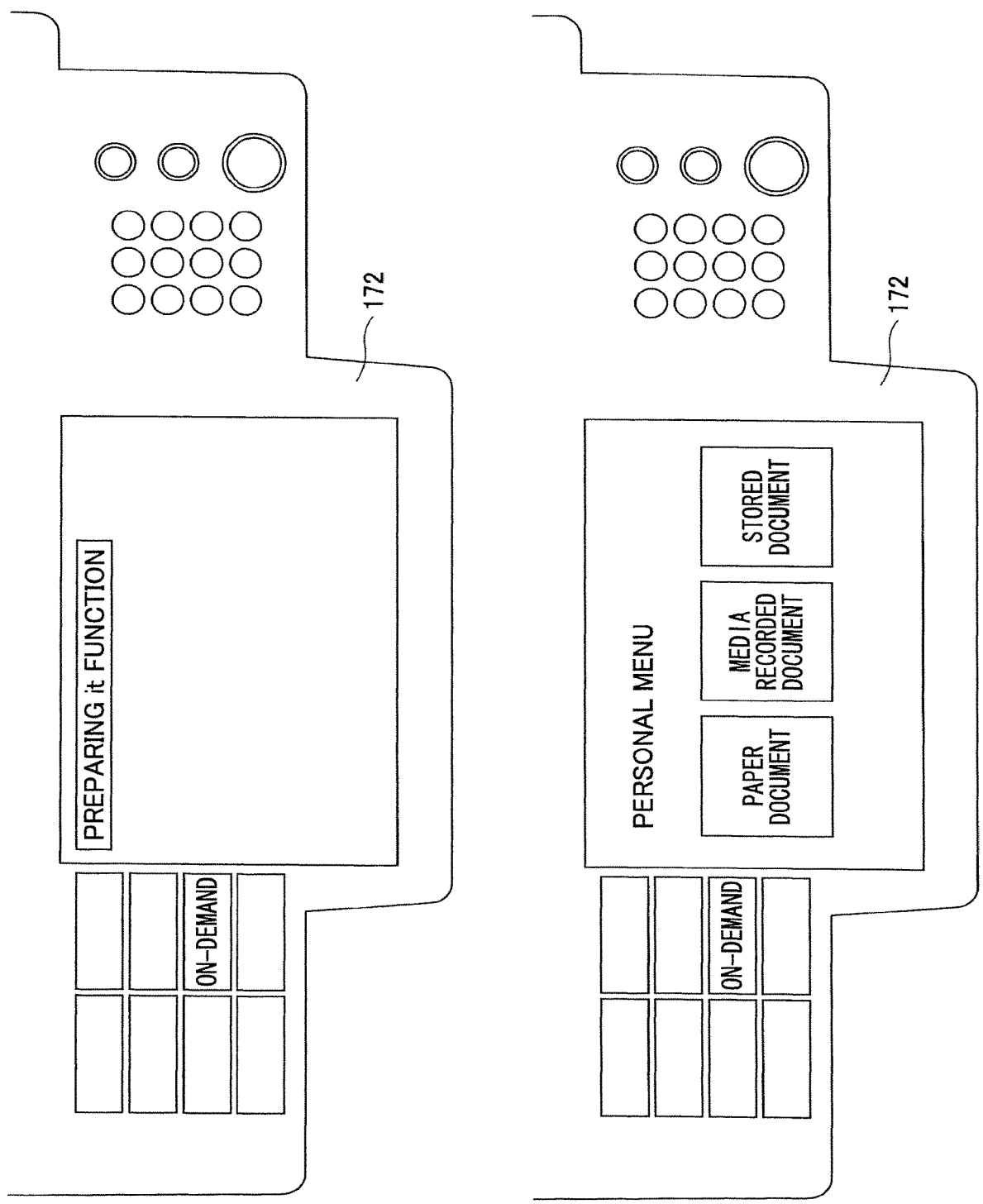
FIGS. 7A and 7B are schematic diagrams for describing the statuses of an operation part in a case where a personal menu is selected by the user according to an embodiment of the present invention.

In a case where execution of the "personal menu" is selected by the user (Step S64), the control part 171 instructs a display part of the operation part 172 to display that the "personal menu" has been selected as shown in FIG. 7A (Step S65). It is to be noted that the "it function" shown in FIGS. 6 and 7A is a generic term indicating a function of the image forming apparatus for directly transmitting and receiving data via a network. Accordingly, the function(s) that can be executed by the personal menu process is included in the "it function" according to an embodiment of the present invention.

Then, the control part 171 initiates a process of logging in to the selected personal menu (Step S66). The image forming apparatus 17 has a password generation part 179 (see FIG. 2) that generates a password based on the user ID extracted from the IC card identification data in Step S61. Accordingly, at this stage, a user ID registered beforehand by the user and a password generated by the password generation part 179 in correspondence with the registered user ID are stored beforehand in the image forming apparatus 17.

Then, the control part 171 determines whether the user ID obtained in Step S61 and the password generated in correspondence with the obtained user ID match the user ID and password stored beforehand in the image forming apparatus 17 (Step S67).

In a case where there is no matching user ID stored in the image forming apparatus 17 according to the determination of Step S67, the control part 171 determines that the user of the user ID is a new user who is not yet registered to the image forming apparatus 17. Accordingly, the control part 171 instructs the operation part 172 to display a user registration screen, to thereby proceed to a user registration process (Step S68).

In a case where the password is incorrect in Step S67, the control part 171 locks the hard keys of the operation part 172 except for the on-demand key (Step S69). In this example, the "on-demand key" is a key provided in the operation part 172 for instructing that a print job already stored in the image forming apparatus 17 be executed.

A case where the password is determined to be incorrect by the image forming apparatus 17 may occur, for example, in a case where the password generated by the password generation part 179, which is a password initially set for logging in to the personal menu, has been changed to an original password of the user by the user. In this case, the control part 171 instructs the operation part 172 to display a screen (e.g. touch panel) enabling input of a password and indicate on the screen that the changed password is to be input (Step S70). When a correct password is input by the user in Step S70, the control part 171 releases the hard key lock state in accordance with the user restriction data (Step S71). Then, the operation returns to the step of determining whether the user ID obtained in Step S61 and the password input in Step S71 match the user ID and the changed password stored beforehand in the image forming apparatus 17.

In a case where, for some reason, an error occurs in the log-in process of Step S67, the control part 171 instructs the operation part 172 to delete the selected "personal menu" displayed in Step S65 (Step S72). Then, the control part 171 instructs the operation part 172 to display that an error has occurred in the process of logging in to the personal menu (error message) (Step S73).

Then, in a state where the user is not logged in to the personal menu, the control part 171 controls the image forming apparatus in accordance with use restriction data so that the user may execute functions allowed to be executed by the user.

In a case where the user ID and password stored in the image forming apparatus 17 match the user ID obtained in Step S61 and the password generated from the obtained user ID, the control part 171 determines that the log-in process is a success. Accordingly, the control part 171 obtains personal data corresponding to the user ID from the personal data storage part 178. Then, the control part 171 controls the image forming apparatus (e.g. restriction of setting conditions regarding use of the image forming apparatus 17) based on the obtained personal data (Step S74).

Then, the control part 171 sets the operation keys of the operation part 172 to a mode allowing the user to operate on the operation keys to be used when the personal menu is selected (Step S75). Then, the control part 171 instructs the operation part 172 to delete the selected "personal menu" displayed in Step S65 (Step S76). Then, the control part 171 instructs the operation part 171 to display a message indicating that the data of the password generated by the password generation part 179 can be browsed by the user (Step S77). Once the message is displayed, the log-in process of the image forming apparatus 17 is finished. Then, the operation part 171 displays a personal menu in correspondence with each user as shown in FIG. 7B.

In a case where the personal menu is not selected (No in Step S64), the control part 171 controls the image forming apparatus 17 based on the use restriction data obtained from the management server 11 in Step S61 (Step S78). Accordingly, the user can use the image forming apparatus 17 within the limits of the controls set in the image forming apparatus 17.

It is to be noted that the browsable data of the password indicated by the operation part 172 in Step S77 includes, for example, data regarding the initial password generated by the password generation part 179 and data required in changing the initial password to an original password of the user. In an embodiment of the present invention, the screen displayed by the operation part 172 in Step S77 may change to a screen for changing the password or to a screen displaying the initial password to the user in a case where the password is already changed by the user. Furthermore, in a case of displaying the password to the user, the password displayed on the screen by the operation part 172 may be automatically erased after a predetermined time has elapsed after the start of displaying the password.

Hence, with the above-described image forming apparatus management system including the management server 11 according to the first embodiment of the present invention, security in managing user data stored inside an image forming apparatus can be strengthened and confidentiality of data can be ensured since the functions of the image forming apparatus(es) 17 are controlled based on user identification data managed in the management server 11.

Since the functions of the image forming apparatus 17 are controlled in correspondence with each user, the image forming apparatus 17 does not need to execute unnecessary processes for the user. Accordingly, the image forming apparatus 17 can be used efficiently. Since the user ID can be obtained by a contactless IC card, operability can be improved since the user does not need to input the user ID each time of logging in. Furthermore, since the image forming apparatus 17 includes a password generation part that generates passwords from the user ID, the image forming apparatus 17 does not need to have passwords stored therein. Therefore, leakage (disclosure) of passwords can be prevented even in a case where leakage of data including user identification data occurs.

The above-described system and apparatus according to the first embodiment of the present invention can be applied even in a case where the format of IC card identification data is changed due to a change in the type of IC card.

Furthermore, with the above-described system and apparatus according to the first embodiment of the present invention, the processes executed by the image forming apparatus 17 can be easily understood since the processes are stored by categorizing the processes in correspondence with each user's identification data and/or the type of process.

Furthermore, with the above-described system and apparatus according to the first embodiment of the present invention, the operation of the entire system and the status of each connected apparatus can be easily understood since the user can browse the status of the entire image forming apparatus management system.

Second Embodiment

Figure 8:
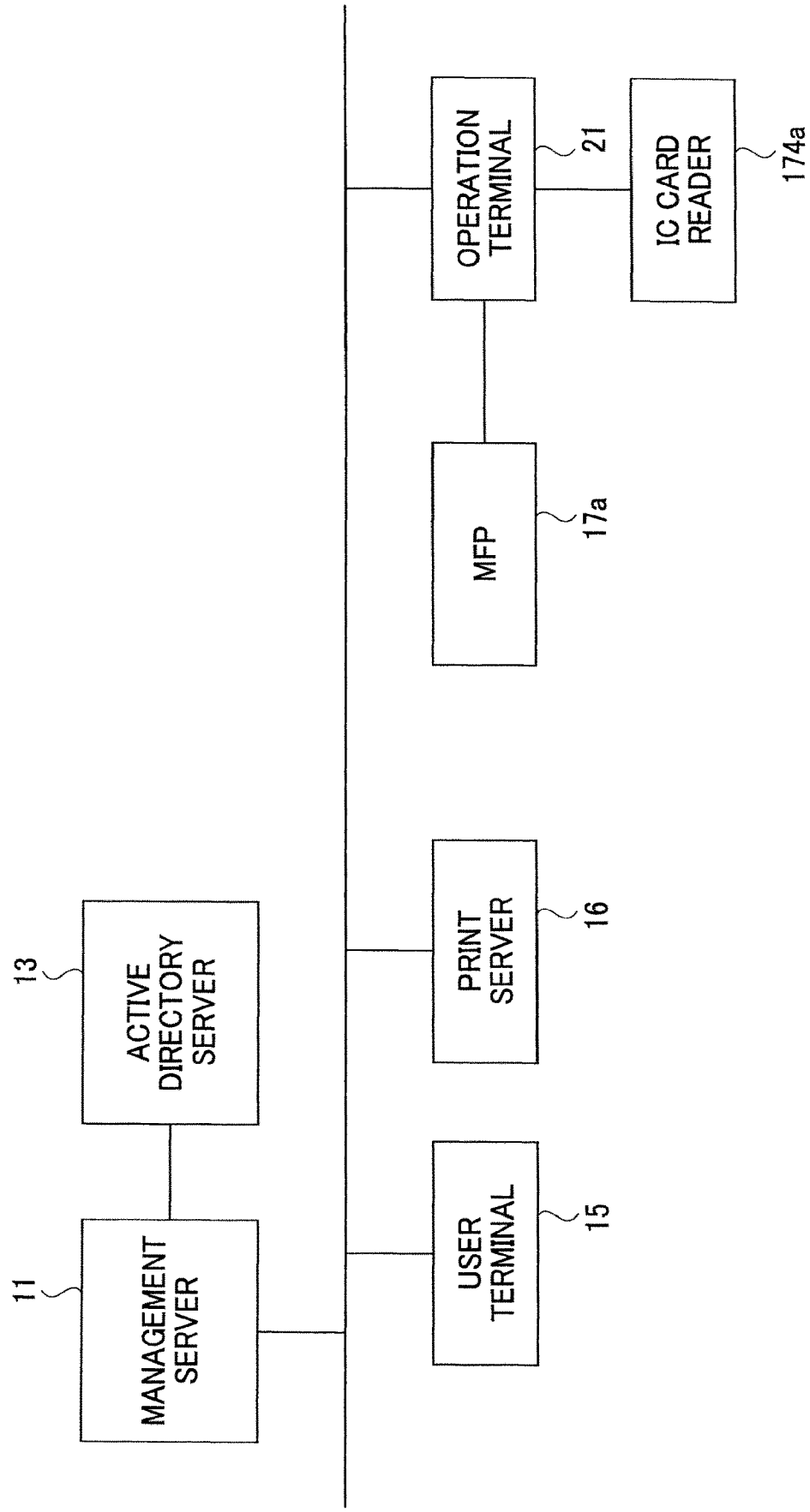
FIG. 8 is a schematic diagram showing an image forming apparatus management system according to a second embodiment of the present invention.

Next, an image forming apparatus management system according to a second embodiment of the present invention is described with reference to FIG. 8. FIG. 8 is a schematic diagram showing an image forming apparatus management system 20 according to the second embodiment of the present invention. In the image forming apparatus management system 20 of the second embodiment shown in FIG. 8, like components are denoted with like numerals as of the image forming apparatus management system of the first embodiment shown in FIG. 1 and are not further explained.

Figure 9:
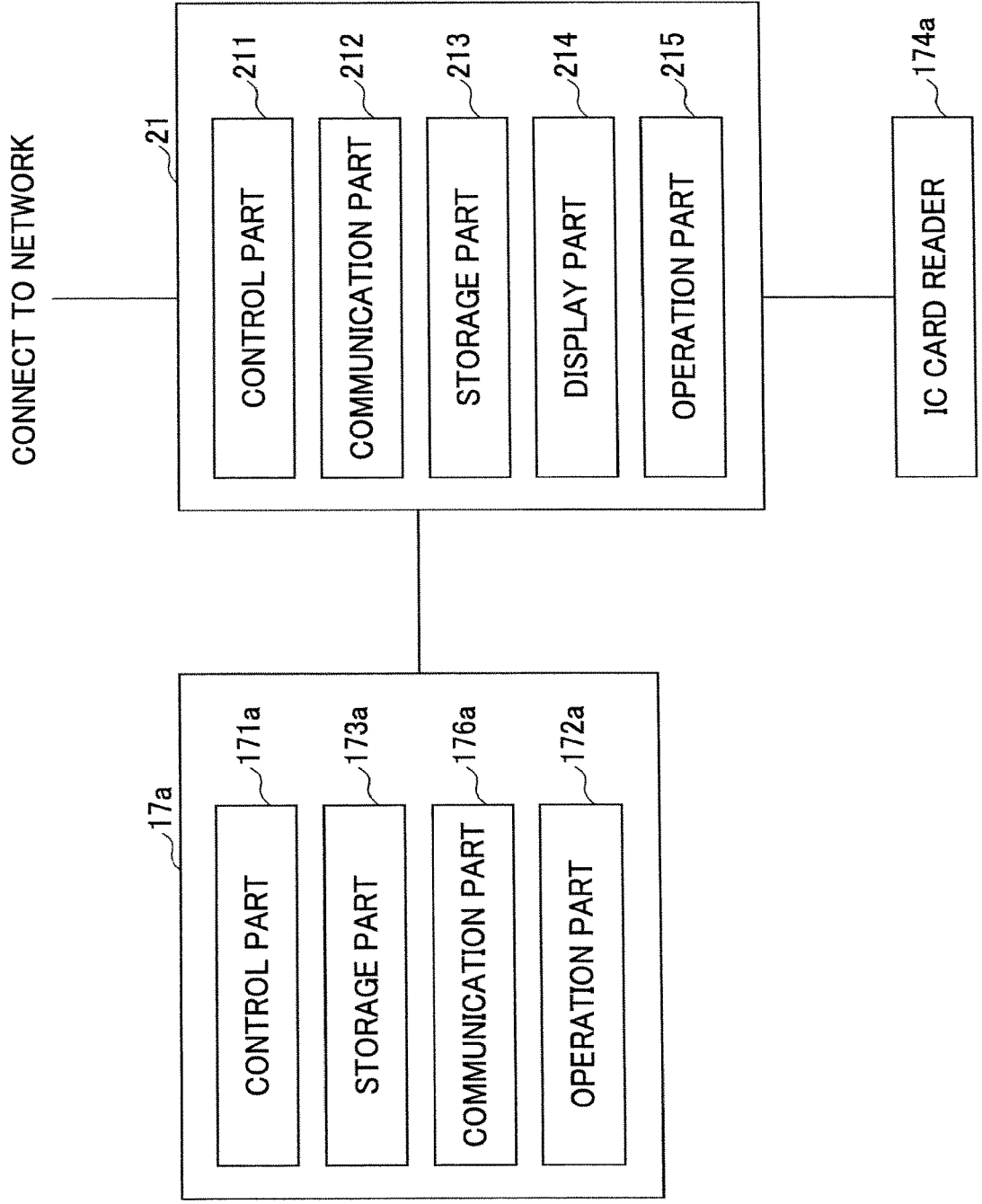
FIG. 9 is a schematic diagram for describing configurations of an image forming apparatus, a control terminal, and an IC card reader according to an embodiment of the present invention.

The image forming apparatus management system 20 according to a second embodiment of the present invention includes an image forming apparatus 17a, an operation terminal 21 for operating the image forming apparatus 17a, and an IC card reader 174a connected to an outer part of the operation terminal 21. In this example, the image forming apparatus 17a, the operation terminal 21, and the IC card reader 174a serve as corresponding parts (components) of the above-described image forming apparatus 17 according to the first embodiment of the present invention. FIG. 9 is a schematic diagram for describing configurations of the image forming apparatus 17a, the operation terminal 21, and the IC card reader 174a according to an embodiment of the present invention.

The image forming apparatus 17a and the IC card reader 174a are connected to an operation terminal 21. The operation terminal 21 is connected to a network included in the image forming apparatus management system 20. The image forming apparatus 17a according to an embodiment of the present invention is serially connected to the operation terminal 21 with, for example, RS 232C. The IC card reader 174a is connected to the operation terminal 21 with, for example, USB.

As shown in FIG. 9, the image forming apparatus 17a includes a control part 171a, an operation part 172a, a storage part 173a, and a communication part 176a. The control part 171a is for executing or controlling the processes of the image forming apparatus 17a for achieving, for example, a printing function, a scanning function, and a copying function. The operation part 172a is for operating the image forming apparatus 17a (e.g. a ten-key, a control panel). The memory part 173a is for storing, for example, setting values (parameters) of the image forming apparatus 17a. The communication part 176a is for communicating with the operation terminal 21.

The operation terminal 21 includes, for example, a computer having a control part 211, a communication part 212, a storage part 213, a display part 214, and an operation part 215. The control part 211 is for executing or controlling the processes of the operation terminal 21 for achieving various functions of the operation terminal 21. The communication part 212 is for communicating between the image forming apparatus 17a, the IC card reader 174a, and other various apparatuses connected to the network.

The storage part 213 is for storing, for example, setting values (parameters) of the operation terminal 21 and temporarily storing, for example, calculation values resulting from processes executed by the control part 211. The storage part 213 may periodically transmit its stored data (e.g. data regarding the settings of the image forming apparatus management system 20, user identification data including IC card identification data and user ID data, use restriction data corresponding to user identification data, history data indicating the history of the user who has used the image forming apparatus 17a) to the management server 11 in preparation for a case where the operation terminal 21 becomes unable to communicate with the management server 11 and the print server 16.

The display part 214 is for displaying, for example, results of the processes executed by the operation terminal 21 and the current status of the image forming apparatus 17a. More specifically, the display part 214 may be a liquid crystal display connected to an outer part of the operation terminal 21. The operation part 215 is for operating the operation terminal 21. More specifically, the operation part 214 may be a keyboard or a mouse connected to an outer part of the operation terminal 21. Since the IC card reader 174a has substantially the same functions as those of the IC card reader described in the first embodiment of the present invention, further description thereof is omitted.

Next, a user authentication process according to the second embodiment of the present invention is described. First, the IC card reader 174a obtains IC card identification data stored in the IC card of the user. Then, the control part 211 of the operation terminal 21 obtains the IC card identification data from the IC card reader 174a. Then, the control part 211 transmits the obtained IC card identification data to the management server 11 via the communication part 212. The management server 11 obtains IC card identification data 121 (see FIG. 3) matching the transmitted IC card identification data in the user data storage part 120, extracts user ID data 122 corresponding to the obtained IC card identification data from the user data storage part 120, and acquires use restriction data 123 corresponding to the extracted user ID data.

Then, the management server 11 transmits the acquired use restriction data 123 to the operation terminal 21 via the communication part 114. The operation terminal 21 obtains use restriction data via the communication part 212 and controls the image forming apparatus 17a according to the obtained use restriction data.

In the image forming apparatus management system 20 according to the second embodiment of the present invention, management of the image forming apparatus 17a is executed by the management server 11 and the operation terminal 21 used for operating the image forming apparatus 17a.

It is to be noted that an application(s) for executing the functions of the data format conversion part 175, the process history storage part 177, the personal data storage part 178, and the password generation part 179 described in the first embodiment of the present invention may be recorded in a recording medium (computer-readable recording medium) readable for the operation terminal 21. In such a case, the operation terminal 21 may be provided with a recording medium reading part (not shown) for reading the applications from the recording medium and executing the functions recorded in the recording medium. Accordingly, the operation terminal 21 may control the image forming apparatus 17a, to thereby execute the functions of the data format conversion part 175, the process history storage part 177, the personal data storage part 178, and the password generation part 179 in correspondence with the functions of the image forming apparatus 17a.

Third Embodiment

Figure 10:
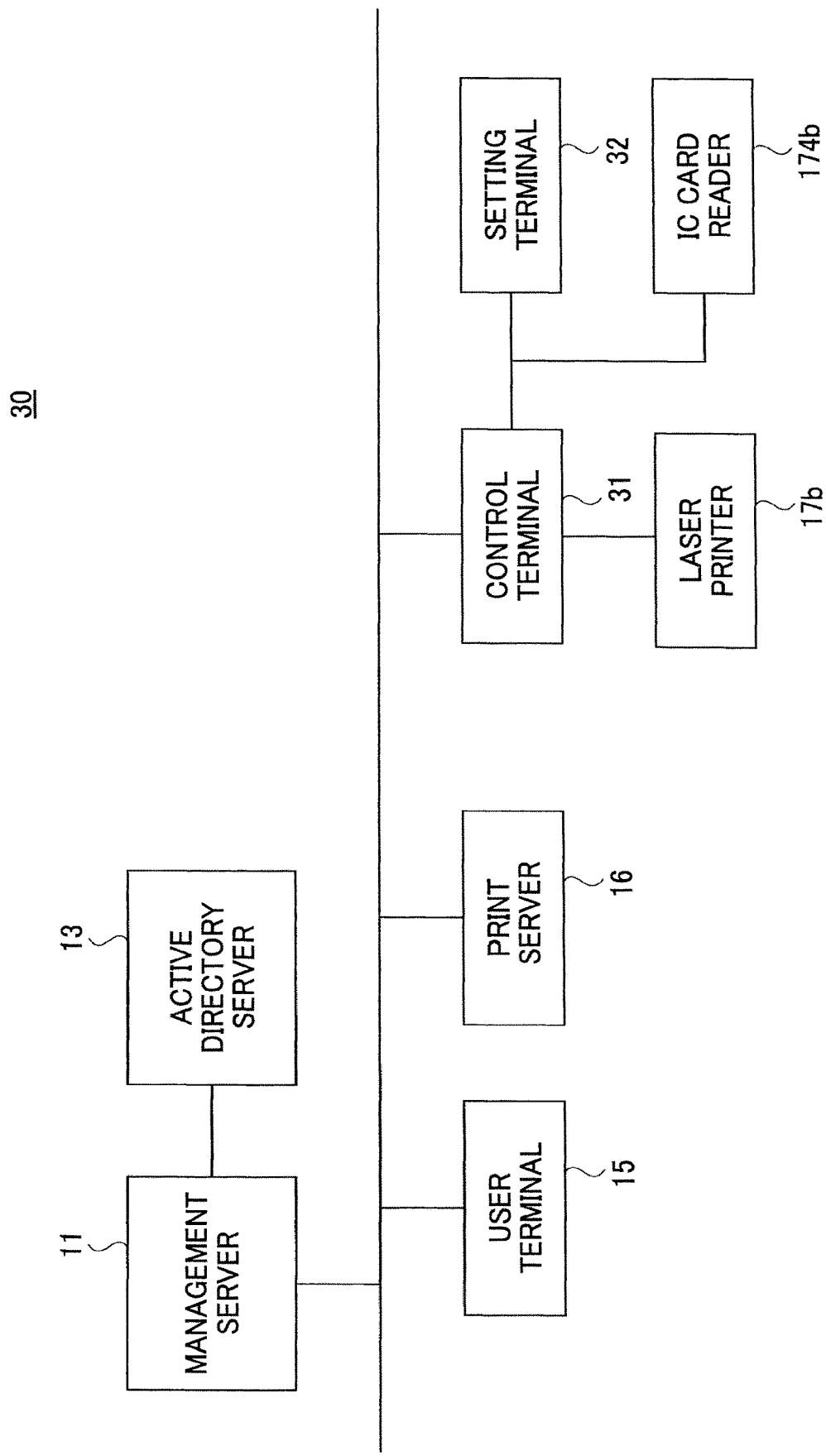
FIG. 10 is a schematic diagram showing an image forming apparatus management system according to a third embodiment of the present invention.

Next, an image forming apparatus management system according to a third embodiment of the present invention is described with reference to FIG. 10. FIG. 10 is a schematic diagram showing an image forming apparatus management system 30 according to the third embodiment of the present invention. In the image forming apparatus management system of the third embodiment shown in FIG. 10, like components are denoted with like numerals as of the image forming apparatus management system of the first and second embodiments shown in FIGS. 1 and 8 and are not further explained.

Figure 11:
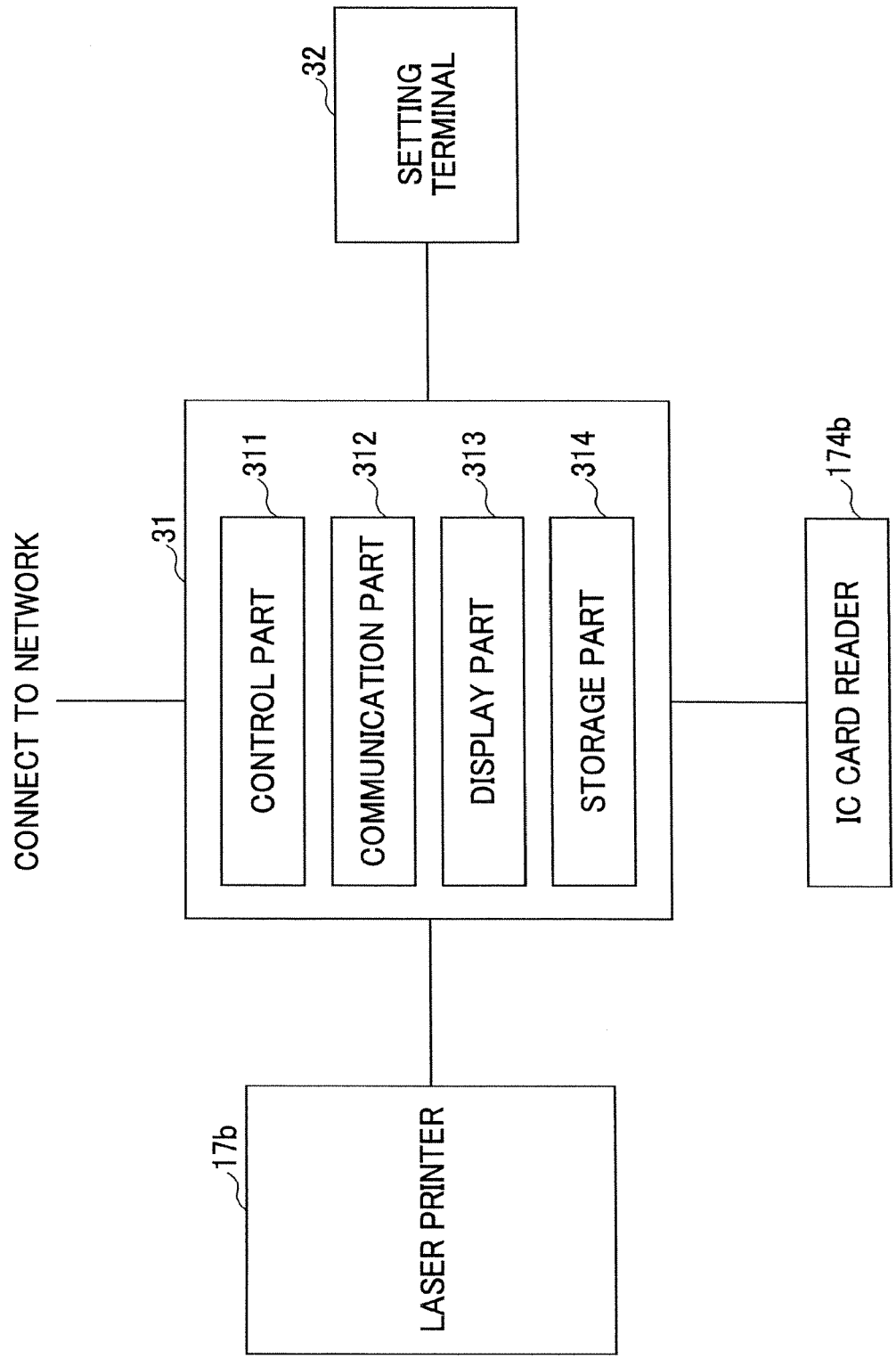
FIG. 11 is a schematic diagram for describing the configurations of a laser printer, a control terminal, a setting terminal, and an IC card reader according to an embodiment of the present invention.

In the image forming apparatus management system 30 of the third embodiment, the parts included in the image forming apparatus 17 of the first embodiment of the present invention are provided as a laser printer 17b (image forming apparatus), a control terminal 31 for controlling the laser printer 17b, a setting terminal 32 for applying various settings to the control terminal 31, and an IC card reader 174b connected to an outer part of the control terminal 31. FIG. 11 is a schematic diagram for describing the configurations of the laser printer 17b, the control terminal 31, the setting terminal 32, and the IC card reader 174b according to an embodiment of the present invention.

The laser printer 17b is an image forming apparatus having a printing function. The control terminal 31 includes a control part 311, a communication part 312, a display part 313, and a storage part 314. The control part 311 is for executing and controlling processes for achieving the functions of the control terminal 31. The communication part 312 is for communication with various apparatuses included in the image forming apparatus management system 30 and the laser printer 17b. The display part 313 is for displaying, for example, the current status of the image forming apparatus management system 30 and the communication status between the control terminal 31 and various apparatuses included in the image forming apparatus management system 30.

The display part 313 includes a combination of three light emitting devices, that is, three LEDs (Light Emitting Diode). This combination of LEDs is used for indicating the statuses of the image forming apparatus management system 30 and various apparatuses included in the image forming apparatus management system 30 to the user. For example, the LEDs may indicate the status (system status) of the image forming apparatus management system 30, the communication status of the control terminal 31 with respect to the management server 31 and the print server 16, the status (apparatus status) of the management server 11, and the status (apparatus status) of the print server 16. The manner in which the statuses are indicated is described in detail below.

The storage part 314 is for storing, for example, setting values (parameters) set to the control terminal 31. The storage part 314 may also periodically transmit its stored data (e.g. data regarding the settings of the image forming apparatus management system 30, user identification data including IC card identification data and user ID data, use restriction data corresponding to user identification data, history data indicating the history of the user who has used the laser printer 17b) to the management server 11 in preparation for a case where the control terminal 31 becomes unable to communicate with the management server 11 and the print server 16.

The IC card reader 174b, which has substantially the same functions as the IC card reader 174a of the second embodiment, is connected to the control terminal 31 with, for example, USB. The setting terminal 32 is for applying various settings to the control terminal 31. The setting terminal may be, for example, a computer. The setting terminal 32 is connected to the control terminal 31 with, for example, a crossing cable.

Next, a user authentication process according to the third embodiment of the present invention is described. First, the IC card reader 174b obtains IC card identification data stored in the IC card of the user. Then, the control part 311 of the control terminal 31 obtains the IC card identification data from the IC card reader 174b. Then, the control part 311 transmits the obtained IC card identification data to the management server 11 via the communication part 312. The management server 11 obtains IC card identification data 121 (see FIG. 3) matching the transmitted IC card identification data in the user data storage part 120, extracts user ID data 122 corresponding to the obtained IC card identification data from the user data storage part 120, and acquires use restriction data 123 corresponding to the extracted user ID data 122.

Then, the management server 11 transmits the acquired use restriction data 123 to the control terminal 31 via the communication part 114. The control terminal 31 obtains use restriction data 123 via the communication part 312 and controls the laser printer 17b according to the obtained use restriction data 123.

In a case where an authenticated user is restricted from using the laser printer 17b according to the use restriction data, the control part 311 locks or keeps an operation key(s) of the laser printer 17b in a locked state such that the operation key(s) cannot be operated by the user (hard key lock state). In a case where an authenticated user is allowed to use the laser printer 17b, the control part 311 releases the hard key lock state of the operation key(s), to thereby allow the user to operate the operation key(s) of the laser printer 17b.

In the image forming apparatus management system 30 according to the third embodiment of the present invention, management of the laser printer (image forming apparatus) 17b is executed by the management server 11 and the control terminal 31. Accordingly, with the image forming apparatus management system 30 according to the third embodiment of the present invention, the above-described management of image forming apparatuses can be achieved without having to prepare expensive image forming apparatuses but with less expensive image forming apparatuses such as a commonly available laser printer.

Next, a display method executed by the display part 313 according to an embodiment of the present invention is described with reference to FIGS. 12A-12M and 13A-13D.

FIGS. 12A-12M are schematic diagrams for describing a display method executed by the display part 313 in a case of displaying the status of the image forming apparatus management system 30. FIGS. 13A-13D are schematic diagrams for describing a display method executed by the display part 313 for displaying the status of a second print server in a case where plural printer servers 16 are connected. The horizontal direction of FIGS. 12A-12M and 13A-13D indicates the elapsing of time, in which one box is equivalent to one second. In FIGS. 12A-12M and 13A-13D, a shift of one box to the right side in the display part 313 indicates a status after one second has elapsed.

The display part 313 of the control terminal 31 includes LED1, LED2, and LED3 which correspond to three colors of green, red, and yellow, respectively. In this example, LED1 is a green LED for indicating the power status of the control terminal 31. The LED1 is lit when the power of the control terminal 31 is switched ON. The LED2 is a red LED for mainly indicating the apparatus status of the control terminal 31. The LED3 is a yellow LED for mainly indicating the apparatus status of the management server 11 and the print server 16 as well as the communication status of the control terminal 31 with respect to the management server 11 and the print server 16. Next, the manner in which the LED2 and LED3 is lit are described with reference to FIGS. 12A-12M.

Figure 12A:
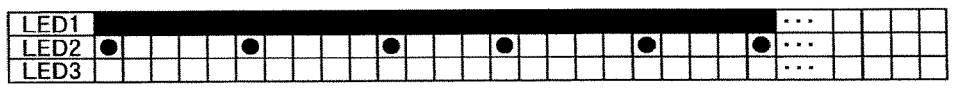
FIGS. 12A-12M are schematic diagrams for describing a display method executed by a display part in a case of displaying the status of the image forming apparatus management system according to an embodiment of the present invention.

FIG. 12A shows the display part 313 indicating that the communication status for a service inside the control terminal 31 is abnormal. In this example, the service inside the control terminal 31 is transmission/reception of data inside the control terminal 31. In a case where the communication status of the service inside the control terminal 31 is abnormal, the LED2 of the display part 313 blinks once every five seconds. That is, after the LED2 is lit for one second, there is an intermission of four seconds where none of the LEDs are lit. Then, after the lapse of four seconds, the LED2 is lit again for one second. In this manner, the display part 313 reports the communication abnormality of the service inside the control terminal 31 to the user.

Figure 12B:
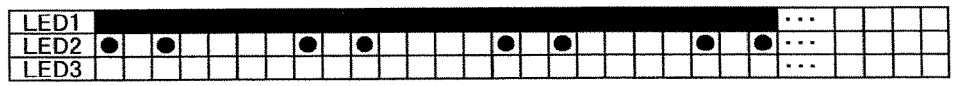

FIG. 12B shows the display part 313 indicating a disk capacity warning of the local disk of the control terminal 31. In a case where the remaining data capacity of the control terminal 31 becomes less than a predetermined capacity, the LED2 blinks every other second for two times. Then, there is an intermission of four seconds where none of the LEDs are lit. Then, after the lapse of four seconds, the LED2 is blinks every other second for two times. In this manner, the display part 313 reports the disk capacity warning of the local disk of the control terminal 31 to the user.

Figure 12C:
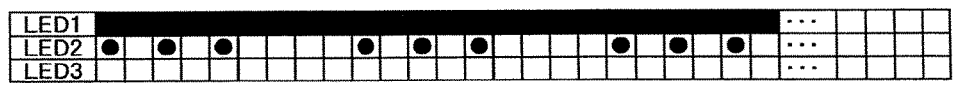

FIG. 12C shows the display part 313 indicating that the apparatus status of the IC card reader 174b is abnormal. In this case, the LED2 blinks every other second for three times. Then, there is an intermission of four seconds where none of the LEDs are lit. Then, after the lapse of four seconds, the LED2 is blinks every other second for three times. In this manner, the display part 313 reports the apparatus abnormality of the IC card reader 174b to the user.

Figure 12D:
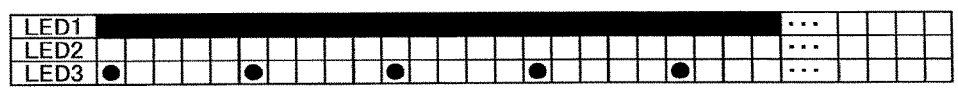

FIG. 12D shows the display part 313 indicating that the device status of the control terminal 31 is abnormal. In this example, abnormality in the device status of the control terminal 313 is malfunction of the control terminal 31 (e.g. unable to perform data communication). In this case, the LED3 blinks once every five seconds. That is, after the LED3 is lit on for one second, there is an intermission of four seconds where none of the LEDs are lit. In this manner, the display part 313 reports the device abnormality of the control terminal 31 to the user.

Figure 12E:
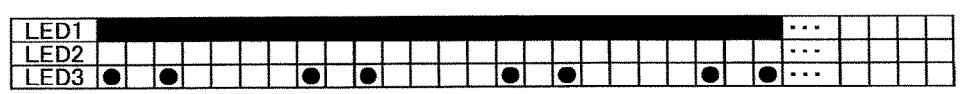

FIG. 12E shows the display part 313 indicating that the communication status with respect to the print server 16 is abnormal. In this case, the LED3 blinks every other second for two times. Then, there is an intermission of four seconds where none of the LEDs are lit. Then, after the lapse of four seconds, the LED3 is blinks every other second for two times. In this manner, the display part 313 reports the abnormal communication between the control terminal 31 and the print server 16 to the user.

Figure 12F:
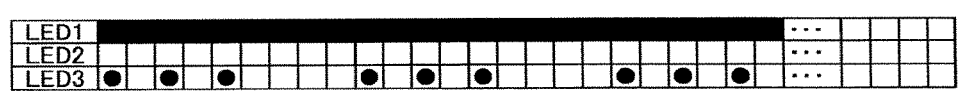

FIG. 12F shows the display part 313 indicating that the communication status with respect to the management server 11 is abnormal. In this case, the LED3 blinks every other second for three times. Then, there is an intermission of four seconds where none of the LEDs are lit. Then, after the lapse of four seconds, the LED3 is blinks every other second for three times. In this manner, the display part 313 reports the abnormal communication between the control terminal 31 and the management server 11 to the user.

Figure 12G:
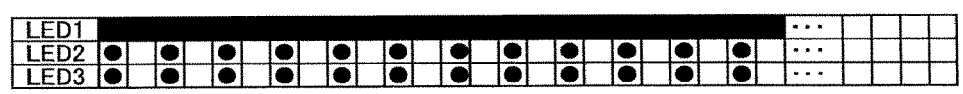
Figure 12H:
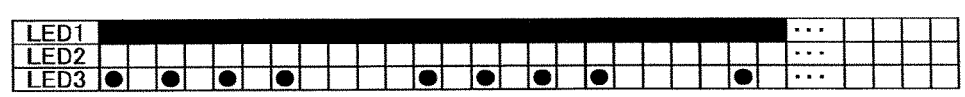

FIG. 12G shows the display part 313 indicating that there is an internal error of the control terminal 31. In this example, internal error is a case where the control terminal 31 is, for some reason, unable to execute a process to be executed inside the control terminal 31. In this case, the LED2 and the LED3 blink at the same timing every other second. In this manner, the display part 313 reports the internal error of the control terminal 31 to the user. FIG. 12H shows the display part 313 indicating that the communication status for a service inside the print server 16 is abnormal. In this case, the LED3 of the display part 313 blinks once every other second for four times. Then, there is an intermission of four seconds where none of the LEDs are lit. Then, after the lapse of four seconds, the LED3 blinks once every other second for four times. In this manner, the display part 313 reports the communication abnormality of the service inside the print server 16 to the user.

Figure 12I:

FIG. 12I shows the display part 313 indicating a disk capacity warning of the print server 16. In a case where the remaining data capacity of the print server 16 becomes less than a predetermined capacity, the LED3 blinks every other second for five times. Then, there is an intermission of four seconds where none of the LEDs are lit. Then, after the lapse of four seconds, the LED3 blinks every other second for five times. In this manner, the display part 313 reports the disk capacity warning of the print server 16 to the user.

Figure 12J:
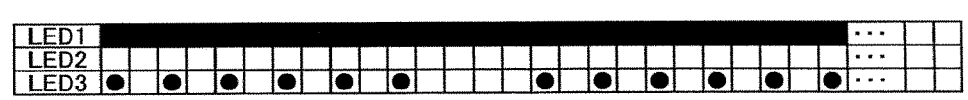

FIG. 12J shows the display part 313 indicating a database capacity warning of the print server 16. In this example, the database of the print server 16 is a data storage area in the printer server 16 where various data are stored. In a case where the remaining data capacity of the database of the print server 16 becomes less than a predetermined capacity, the LED3 blinks every other second for six times. Then, there is an intermission of four seconds where none of the LEDs are lit. Then, after the lapse of four seconds, the LED3 blinks every other second for six times. In this manner, the display part 313 reports the database capacity warning of the print server 16 to the user.

Figure 12K:
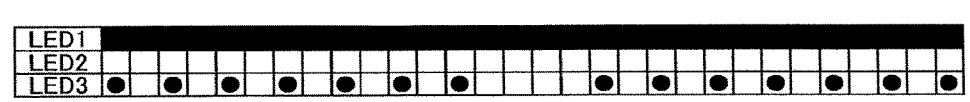

FIG. 12K shows the display part 313 indicating that the communication status for a service inside the management server 11 is abnormal. In this case, the LED3 of the display part 313 blinks once every other second for seven times. Then, there is an intermission of four seconds where none of the LEDs are lit. Then, after the lapse of four seconds, the LED3 blinks once every other second for seven times. In this manner, the display part 313 reports the communication abnormality of the service inside the management server 11 to the user.

Figure 12L:
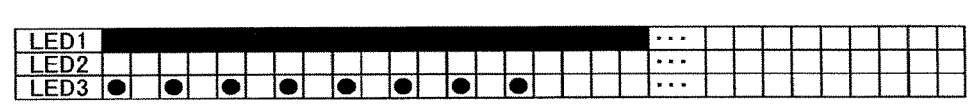

FIG. 12L shows the display part 313 indicating a disk capacity warning of the management server 11. In a case where the remaining data capacity of the management server 11 becomes less than a predetermined capacity, the LED3 blinks every other second for eight times. Then, there is an intermission of four seconds where none of the LEDs are lit. Then, after the lapse of four seconds, the LED3 blinks every other second for eight times. In this manner, the display part 313 reports the disk capacity warning of the management server 11 to the user.

Figure 12M:
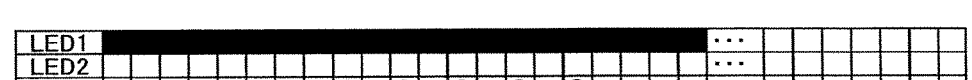

FIG. 12M shows the display part 313 indicating a database capacity warning of the management server 11. In this example, the database of the management server 11 is a data storage area in the management server 11 where various data are stored. In a case where the remaining data capacity of the database of the management server 11 becomes less than a predetermined capacity, the LED3 blinks every other second for nine times. Then, there is an intermission of four seconds where none of the LEDs are lit. Then, after the lapse of four seconds, the LED3 blinks every other second for nine times. In this manner, the display part 313 reports the database capacity warning of the management server 11 to the user.

Accordingly, with the display part 313 of the control terminal 31, the apparatus status of the control terminal 31, the management server 11, and the print server 16 as well as the communication status of the control terminal 31 with respect to the management server 11 and the print server 16 can be viewed by the user.

The image forming apparatus management system 30 according to an embodiment of the present invention may be provided with plural print servers 16. Next, the manner in which an LED2 and an LED3 of a second print server 16' (not shown) is lit is described with reference to FIGS. 13A-13D. In FIGS. 13A-13D, the mark "!" indicates that the period in which the LED is lit is shorter than one second. For example, "●!●" indicates that an LED blinks twice with an interval shorter than one second.

Figure 13A:
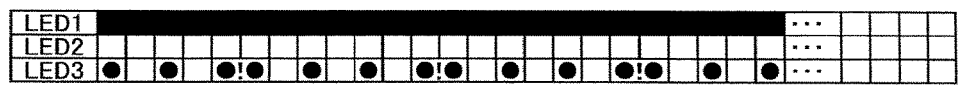
FIGS. 13A-13D are schematic diagrams for describing a display method executed by a display part for displaying the status of a second print server in a case where plural printer servers are connected.

FIG. 13A shows the display part 313 indicating that the communication status between the second print server 16' and the control terminal 31 is abnormal. In this case, the LED3 of the display part 313 blinks every other second for two times. Then, during a period of four seconds, the LED3 blinks twice with an interval shorter than one second. Then, after the lapse of four seconds, the LED3 blinks once every other second for two times. In this manner, the display part 313 reports the communication abnormality between the second print server 16' and the control terminal 31 to the user.

Figure 13B:
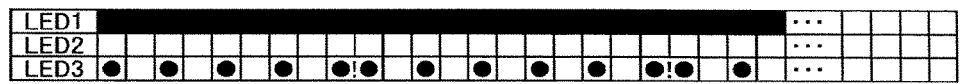

FIG. 13B shows the display part 313 indicating that the communication status for a service inside the second print server 16' is abnormal. In this case, the LED3 of the display part 313 blinks once every other second for four times. Then, during a period of four seconds, the LED3 blinks twice with an interval shorter than one second. Then, after the period of four seconds, the LED3 blinks once every other second for four times. In this manner, the display part 313 reports the communication abnormality of the service inside the second print server 16' to the user.

Figure 13C:
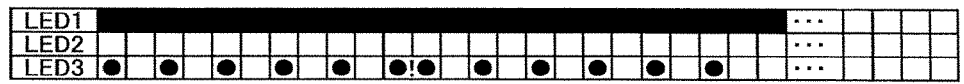

FIG. 13C shows the display part 313 indicating a disk capacity warning of the second print server 16'. In a case where the remaining data capacity of the second print server 16' becomes less than a predetermined capacity, the LED3 blinks every other second for five times. Then, during a period of four seconds, the LED3 blinks twice with an interval shorter than one second. Then, after the period of four seconds, the LED3 blinks once every other second for five times. In this manner, the display part 313 reports the disk capacity warning of the second print server 16' to the user.

Figure 13D:
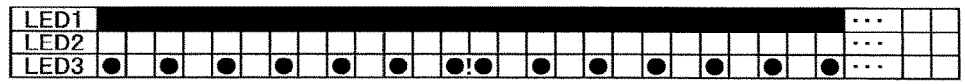

FIG. 13D shows the display part 313 indicating a database capacity warning of the second print server 16'. In this example, the database of the second print server 16' is a data storage area in the second print server 16' where various data are stored. In a case where the remaining data capacity of the database of the second print server 16' becomes less than a predetermined capacity, the LED3 blinks every other second for six times. Then, during a period of four seconds, the LED3 blinks twice with an interval shorter than one second. Then, after the period of four seconds, the LED3 blinks once every other second for six times. In this manner, the display part 313 reports the database capacity warning of the second print server 16' to the user.

Accordingly, with the display part 313 of the control terminal 31 in a case where the control terminal 31 is connected to plural print servers, the apparatus status of the other plural print servers as well as the communication status of the control terminal 31 with respect to the other plural print servers can be viewed by the user.

Further, the present invention is not limited to these embodiments, but variations and modifications may be made without departing from the scope of the present invention.

What is claimed is:
1. A first apparatus comprising:
   circuitry configured to
      connect to a second apparatus via a network, the second apparatus storing first user data, store, in a memory, second user data when the first apparatus is unable to communicate with the second apparatus, receive identification data for user authentication, execute, in response to the first apparatus being unable to execute a user authentication process using the first user data stored in the second apparatus based on the received identification data, the user authentication process using the second user data based on the received identification data, and control a login process based on a result of the user authentication process.

2. The first apparatus as claimed in claim 1, wherein the circuitry is further configured to store, in the memory, the second user data, which includes the identification data for user authentication and use restriction data.

3. The first apparatus as claimed in claim 2, wherein the identification data for user authentication included in the second user data that is stored by the circuitry in the memory includes recording medium identification data and user identification data.

4. The first apparatus as claimed in claim 1, wherein the circuitry is further configured to execute, in response to the login process being a success, control of allowing a user as an authorized user by the user authentication process to use an image forming apparatus.

5. The first apparatus as claimed in claim 1, wherein the circuitry is further configured to execute the user authentication process using the second user data based on the received identification data, in response to a result that the first apparatus has become unable to communicate with the second apparatus.

6. An authentication system comprising:
a first apparatus; and
a second apparatus storing first user data, wherein
the first apparatus includes first circuitry configured to
connect to the second apparatus via a network,
store, in a memory, second user data used when the first apparatus is unable to communicate with the second apparatus,
receive identification data for user authentication,
execute, in response to the first apparatus being unable to execute a user authentication process using the first user data stored in the second apparatus based on the received identification data, the user authentication process using the second user data based on the received identification data, and
control a login process based on a result of the user authentication process, and
the second apparatus includes second circuitry configured to execute the user authentication process based on the received identification data.

7. The authentication system as claimed in claim 6, wherein the first circuitry is further configured to store, in the memory, the second user data, which includes the identification data for user authentication and use restriction data.

8. The authentication system as claimed in claim 7, wherein the identification data for user authentication included in the second user data that is stored by the first circuitry in the memory includes recording medium identification data and user identification data.

9. The authentication system as claimed in claim 6, wherein the first circuitry is configured to connect to a third apparatus via the network, and control execution of the user authentication process using the third apparatus.

10. A method for a first apparatus, the method comprising:
connecting to a second apparatus via a network, the second apparatus storing first user data;
storing, in a memory, second user data used when the first apparatus is unable to communicate with the second apparatus;
receiving identification data for user authentication;
executing, in response to the first apparatus being unable to execute a user authentication process using the first user data stored in the second apparatus based on the received identification data, the user authentication process using the second user data based on the received identification data; and
controlling a login process based on a result of the user authentication process.

11. The method as claimed in claim 10, wherein the storing stores the second user data, which includes the identification data for user authentication and use restriction data.

12. The method as claimed in claim 11, wherein the identification data for user authentication included in the second user data stored by the storing includes a recording medium identification data and user identification data.

13. The method as claimed in claim 10, further comprising executing, in response to the login process being a success, control of allowing a user as an authorized user by the user authentication process to use an image forming apparatus.

14. The method as claimed in claim 10, further comprising executing the user authentication process using the second user data based on the received identification data, in response to a result that the first apparatus has become unable to communicate with the second apparatus.

* * * * *